(12) United States Patent
Attarwala et al.

(10) Patent No.: US 7,537,839 B1
(45) Date of Patent: May 26, 2009

(54) ADHESIVE COMPOSITIONS FREE OF METALLIC CATALYST

(75) Inventors: Shabbir Attarwala, Simsbury, CT (US); Qinyan Zhu, Cheshire, CT (US); Susan Lamtruong Levandoski, Bristol, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 11/695,091

(22) Filed: Apr. 2, 2007

Related U.S. Application Data

(62) Division of application No. 10/827,324, filed on Apr. 20, 2004, now Pat. No. 7,271,227.

(60) Provisional application No. 60/471,598, filed on May 19, 2003.

(51) Int. Cl.
 *C09J 135/02* (2006.01)
 *C09J 135/04* (2006.01)
 *C09J 179/00* (2006.01)

(52) U.S. Cl. .................. 428/463; 411/82.2; 156/331.1; 156/331.5; 528/322; 528/362; 528/392; 526/205; 526/262; 526/299; 526/300

(58) Field of Classification Search .............. None
See application file for complete search history.

(56) References Cited

U.S. PATENT DOCUMENTS

| | | | |
|---|---|---|---|
| 3,553,244 A | 1/1971 | Grigat et al. | |
| 3,880,956 A | 4/1975 | Skoultchi | |
| 3,957,561 A | 5/1976 | Skoultchi | |
| 3,988,299 A | 10/1976 | Malofsky | |
| 4,330,658 A | 5/1982 | Ikeguchi et al. | |
| 4,330,669 A | 5/1982 | Ikeguchi et al. | |
| 4,369,304 A | 1/1983 | Gaku et al. | |
| 4,373,086 A * | 2/1983 | Ikeguchi | 528/322 |
| 4,383,903 A | 5/1983 | Ayano et al. | |
| 4,477,629 A | 10/1984 | Hefner, Jr. | |
| 4,503,186 A | 3/1985 | Sugio et al. | |
| 4,528,366 A | 7/1985 | Woo et al. | |
| 4,785,075 A | 11/1988 | Shimp | |
| 5,798,757 A | 8/1998 | Smith | |
| 6,034,194 A | 3/2000 | Dershem et al. | |
| 6,034,195 A | 3/2000 | Dershem et al. | |
| 6,069,219 A | 5/2000 | McCormick et al. | |
| 6,187,886 B1 | 2/2001 | Husson, Jr. et al. | |
| 6,391,993 B1 | 5/2002 | Attarwala et al. | |
| 6,958,368 B1 * | 10/2005 | Klemarczyk et al. | 523/176 |

FOREIGN PATENT DOCUMENTS

| | | |
|---|---|---|
| GB | 1 305 702 | 2/1970 |
| WO | WO 85/02184 A1 | 5/1985 |

OTHER PUBLICATIONS

I.A. Hammerton, "The Chemistry and Technology of Cyanate Esters", *Blackie Academic & Professional* (1994).

* cited by examiner

*Primary Examiner*—David Buttner
(74) *Attorney, Agent, or Firm*—Steven C. Bauman

(57) ABSTRACT

The present invention generally relates to anaerobically curable compositions of:
 (a) a cyanate ester compound having the structure of formula I:

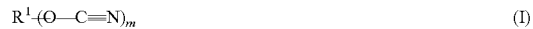

$$R^1\text{-(O-C}\equiv\text{N)}_m \qquad (I)$$

wherein m is from 2 to 5 and $R^1$ is an aromatic nucleus-containing residue;
 (b) a (meth)acrylate monomer; and
 (c) an anaerobic cure inducing composition comprising peroxide and saccharin, wherein said composition is free of added metallic catalyst.

15 Claims, 2 Drawing Sheets

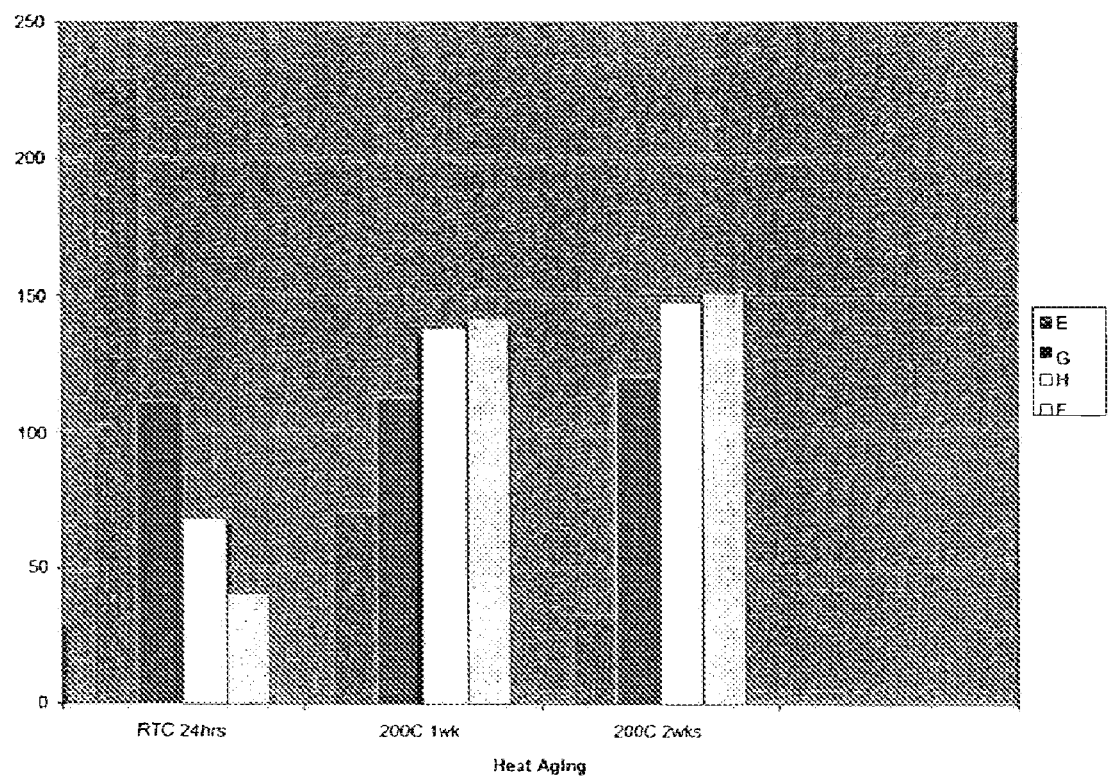
Figure 1 Hot Strength of PEGMA/Cyanate Ester Formulations

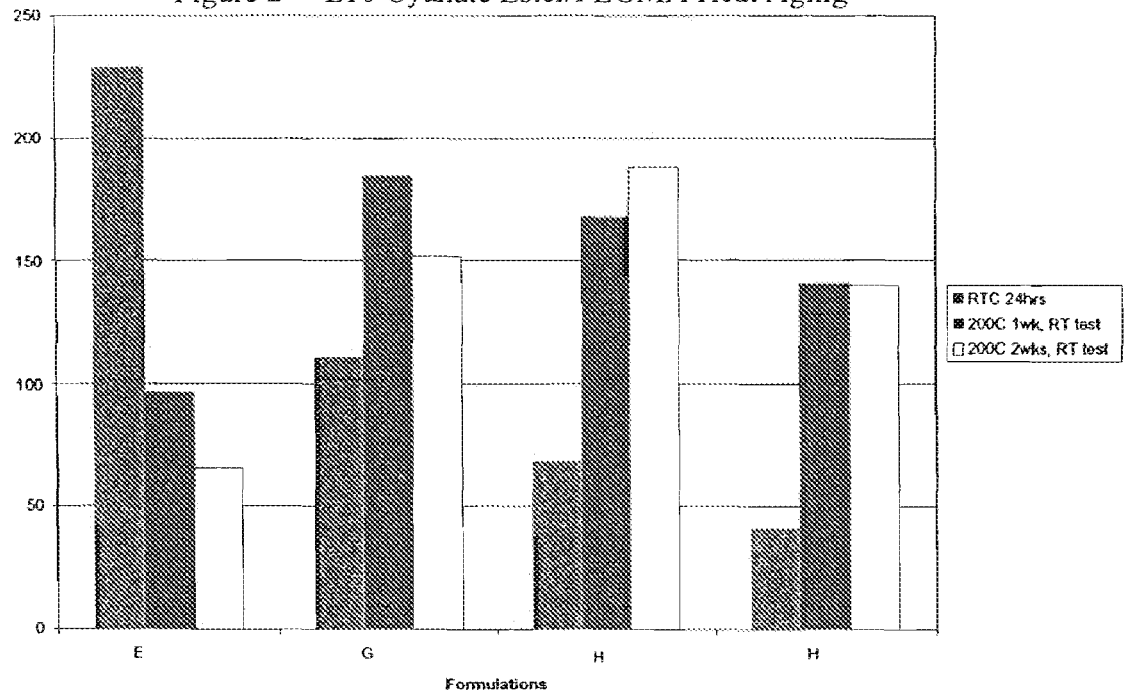

ADHESIVE COMPOSITIONS FREE OF METALLIC CATALYST

CROSS REFERENCE TO RELATED APPLICATIONS

This application is a division of U.S. patent application Ser. No. 10/827,324, filed Apr. 20, 2004 (now U.S. Pat. No. 7,271,227, issued Sep. 18, 2007) which claims the benefit of an earlier filing date from U.S. Provisional Application No. 60/471,598, filed May 19, 2003.

BACKGROUND OF THE INVENTION

1. Field of the Invention

The present invention generally relates to curable compositions free of added metal catalysts. The inventive compositions are capable of curing when applied to a metal substrate. The inventive compositions provide improved thermal performance and enhanced cure strength, particularly on oily metal surfaces.

2. Brief Description of Related Technology

Curable compositions are used in a broad range of industries, including the construction, appliance and automobile industries. Typically, curable compositions used in these industries have been tailored to provide properties required for the application at hand. Such properties include, in the cured state, strength, toughness and thermal stability. In addition, adhesion to substrates constructed from a variety of different materials and oil resistance are also often desired. Adhesives may be used as high strength bonding materials including rapid-fixturing structural adhesives, and also as materials which serve primarily to seal or lock the joint between adjacent surfaces (such as threadlocking compounds for nuts and bolts) where comparatively low adhesion is adequate.

One type of curable composition, which has found wide utility in a number of industrial applications, and has been particularly important to the metal-working industry, are anaerobic adhesives. These compositions remain liquid in the presence of air, but polymerize upon the exclusion of air to form hard, durable resins with excellent adhesive properties. Since air is excluded between mating surfaces of metal articles, these adhesives are particularly useful in threadlocking applications.

In those applications where at least one substrate to be bonded contains a metal surface such as iron, copper or alloys of such metals, it has long been recognized that the metal may act to catalyze the cure of acrylic anaerobic compositions. Because the catalytic effect is not always positive (in some instances the metal substrate tends to poison the desired reaction) there have been attempts to develop compositions to beneficially exploit the catalytic action of metallic active surfaces since such compositions would be convenient and allow for a one-component adhesive. For example, Skoultchi, in U.S. Pat. No. 3,880,956 discloses anaerobic acrylic adhesive compositions which are activated by contact with metal surfaces. These compositions are single package anaerobic compositions containing diazonium salt catalysts which cure through a free radical polymerization mechanism when excluded from air or oxygen and are in contact with certain metal surfaces such as iron, copper, alloys of these metals, cadmium, chromium, nickel and zinc chromate platings. Additionally, Skoultchi, in U.S. Pat. No. 3,957,561 discloses one-package acrylic anaerobic compositions comprising at least one diazosulfone compound and o-sulfobenzimide which cure through a free radical polymerization mechanism when the adhesive is excluded from air or oxygen and is in contact with active metal surfaces.

Although these compositions are convenient to use, none of them specifically disclose the use of oily metal surfaces to effectuate cure. Oftentimes, substrates are contaminated with oil and must be degreased to facilitate bonding. Such degreasing may require suspension in solvents which may require compliance with governmental regulations or time consuming cleaning steps. Hence, there is a need for a curable composition that is oil resistant and does not require the use of added metal catalyst when used to bond metal substrates.

Further, the bonding of metal substrates used in numerous applications in the automobile and other industries often may require that the adhesive composition have excellent thermal stability. Cyanate ester resin-based compositions are known to have desirable thermal properties and show excellent adhesion to metal, especially to steel (see, e.g., U.S. Pat. No. 6,069,219 and "The Chemistry and Technology of Cyanate Esters" by I. A. Hammerton 1994 Blackie Academic & Professional for other uses and properties of cyanate esters). These resins may be produced by reacting a phenolic compound with cyanogen halide and upon curing, are known to form hard matrices through cyclotrimerization of the cyanate ester groups (see, e.g., U.S. Pat. No. 3,553,244). The cyclotrimerization produces aryoxytriazine rings that serve as crosslink sites and the cure is effected in the presence of heat by catalysts such as those described in U.S. Pat. Nos. 4,330,658, 4,330,669, 4,785,075 and 4,528,366 which include transition metal catalysts such as Zn, Cd, Cu, and Ni salts. Organometallic catalysts have been also reported in U.S. Pat. No. 6,069,219 to effect cure of acrylic anaerobic/cyanate esters compositions. The disclosed compositions call for the addition of transition metal or other catalyst.

Maleimides have also been used in anaerobically curable compositions to impart improved resistance to thermal degradation and/or to improve strength properties at elevated temperatures (see, e.g. U.S. Pat. No. 3,988,299, 6,034,194, 6,034,195, and 6,391,993). Additionally, maleimides have also been used with cyanate esters resulting in compositions having good dielectric properties useful for laminate preparation (see e.g. U.S. Pat. Nos. 5,789,757 and 6,187,886).

There still, however, remains a need in the art for an oil resistant, thermally stable curable composition exhibiting high strength at elevated temperatures for use as a threadlocking adhesive that does not require the composition to include an added metal catalyst.

SUMMARY OF THE INVENTION

The invention provides an anerobically curable composition including a) a cyanate ester compound having the structure of formula I:

$$R^1\text{-}(O\text{---}C\equiv N)_m \qquad (I)$$

where m is from 2 to 5 and $R^1$ is an aromatic nucleus-containing residue and b) a (meth)acrylate monomer, where the composition is free of added metallic catalyst.

Further, the invention provides a curable composition including the reaction product of (a) a cyanate ester compound having the formula:

$$R^1\text{-}(O\text{---}C\equiv N)_m \qquad (I)$$

where m is from 2 to 5 and $R^1$ is an aromatic nucleus-containing residue, (b) a (meth)acrylate monomer, where the components is free of added metallic catalyst and (c) an active metallic surface.

Also the invention provides a method for bonding metallic surfaces including (a) providing activated metallic mating surfaces; (b) applying to at least one of the mating surfaces a curable composition comprising a cyanate ester compound having the formula:

where m is from 2 to 5 and $R^1$ is an aromatic nucleus-containing residue and the composition is free of added metallic catalyst; and (c) mating the surfaces and allowing the curable composition to cure therebetween.

The invention also includes an article of manufacture including substrates having active metallic surfaces and a cured composition therebetween to adhesively join the substrates to one and the other, where the cured composition comprises a cyanate ester compound and the composition is free of added metallic catalyst.

In addition the invention provides a cured composition formed by the process of (a) providing a substrate having an active metallic surface and (b) applying a curable composition therebetween where the curable composition comprises a cyanate ester compound where the composition is free of added metallic catalyst; and subjecting the composition to conditions suitable to effectuate cure.

The invention still further provides a method of forming a bond including the steps of (a) applying a composition comprising the reaction product of (i) a cyanate ester compound free of added metallic catalyst and (ii) an active metallic surface; and (b) subjecting the composition to conditions suitable to effectuate cure, thereby forming a bond.

Also the invention provides a method for producing threadlocking matable parts the method including the steps of (a) applying a composition including a cyanate ester compound free of added metallic catalyst to at least a portion of an engagement surface of a matable part which is matably engageable with a complimentary engagement structure; (b) mating the complimentary engagement structures; (c) subjecting the composition to conditions suitable to effectuate cure, thereby forming threadlocked matable parts.

The invention provides a method of providing a multi-staging curable composition to obtain increased thermal resistance including (a) combining curable components, the components including a first curable component including a (meth)acrylate monomer, the monomer curing at ambient temperature; (b) a second curable component including a cyanate ester, the second component free of added metallic catalyst, which cures at ambient temperature in the presence of an active metallic surface; and (c) a third curable component including a maleimide which cures at about 200° C. or more and which imparts hot strength up to 600° C.

The invention also provides a multi-staging curable composition for obtaining increased thermal resistance and hot strength including: (a) a (meth)acrylate monomer; (b) a cyanate ester free of added metallic catalyst; and (c) one of more of a maleimide, a nadimide and an itaconimide.

BRIEF DESCRIPTION OF THE FIGURES

FIG. 1 depicts a graft showing hot strength of methacrylate/cyanate ester (L-10) containing curable compositions.

FIG. 2 depicts a graft showing heat aged strength retention of methacrylate/cyanate ester (L-10) containing curable compositions.

DETAILED DESCRIPTION OF THE INVENTION

The present invention provides a curable composition containing a cyanate ester compound which may be employed to effectively bond metal surfaces. Upon curing, the composition exhibits good bonding properties and weathering characteristics with zinc, copper, cadmium, nickel, iron, tin, aluminum, silver, chromium, alloys of such metals and metallic coatings or plating of such metals, such as steel, without the necessity of adding a metal catalyst to the composition before application to these surfaces.

The term "curing", or "cure" as used herein, refers to a change in state, condition, and/or structure in a material, as well as, partial and complete curing.

The surfaces of these metals alloys and metallic platings can, for convenience, be called "active metallic surfaces" and this term is understood to include but not be limited to the above mentioned metal species.

Curable compositions prepared according to this invention are useful as threadlocking materials to be applied to the threads of a threaded fastener to form a tight bond between the fastener and its threaded receiving member, e.g. a bolt and nut. Additionally, the effectiveness of this composition is not diminished, and may be enhanced, without the need to degrease the metal substrate.

The anaerobically curable composition of the invention useful for threadlocking includes a cyanate ester compound having general structural formula I:

where m is from 2 to 5 and $R^1$ is an aromatic nucleus-containing residue and an (meth)acrylate monomer. The composition is free of added metallic catalyst.

$R^1$ of formula I should contain at least 6 carbon atoms and may be derived, for example, from aromatic hydrocarbons, such as benzene, biphenyl, naphthalene, anthracene, pyrene or the like. The aromatic residue may be also be derived from a polynuclear aromatic hydrocarbon in which at least two aromatic rings are attached to each other through a bridging group.

In one embodiment, the bridging member has the formula

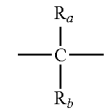

where $R_a$ and $R_b$ are the same or different and each represents a hydrogen atom or an alkyl group containing 1 to 4 carbon atoms.

$R^1$ also includes residues derived from novolac-type phenolic resins—i.e. cyanate esters of these phenolic resins. $R^1$ may also contain further ring attached, non-reactive substituents.

Examples of useful cyanate esters include, for instance, 1,3-dicyanatobenzene; 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane and 3,3',5,5'-tetramethyl, bis(4-cyanatophenyl)methane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)sulfide; 2,2-bis(4-cyanatophenyl)propane; tris(4-cyanatophenyl)-phosphite; tris(4-cyanatophenyl)phosphate; bis(3-chloro-4-cyanatophenyl)methane; cyanated novolac; 1,3-bis[4-cyanatophenyl-1-(methylethylidene)]benzene and cyanated, bisphenol-terminated polycarbonate or other thermoplastic oligomer.

Other cyanate esters include cyanates disclosed in U.S. Pat. Nos. 4,477,629 and 4,528,366, the disclosure of each of which is hereby expressly incorporated herein by reference; the cyanate esters disclosed in U.K. Patent No. 1,305,702, and the cyanate esters disclosed in International Patent Publication No. WO 85/02184, the disclosure of each of which is hereby expressly incorporated herein by reference.

Particularly desirable cyanate esters for use herein are available commercially from Ciba Specialty Chemicals, Tarrytown, N.Y. under the tradename "AROCY" [1,1-di(4-cyanatophenylethane)]. The structures of four desirable "AROCY" cyanate esters are (Meth)acrylate monomers suitable for use herein include hydroxypropyl (meth)acrylate ("HPMA"), hydroxyethyl (meth)acrylate ("HEMA"), cyclohexyl (meth)acrylate, tetrahydrofuran (meth)acrylates, glycidyl (meth)acrylates, cyanoethyl (meth)acrylate, hexanediol di(meth)acrylate, polyethylene glycol di(meth)acrylates, diethylene glycol di(meth)acrylate, triethylene glycol di(meth)acrylate ("TRIEGMA"), tetraethylene glycol di(meth)acrylate, dipropylene glycol di(meth)acrylate, di-(pentamethylene glycol) di(meth)acrylate, tetraethylene diglycol di(meth)acrylate, neopentyl glycol diacrylate, tetramethylene di(meth)acrylate, ethylene

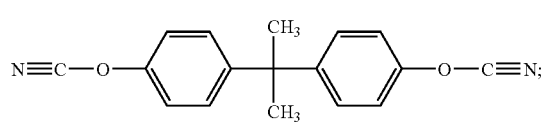

"AROCY" B-10

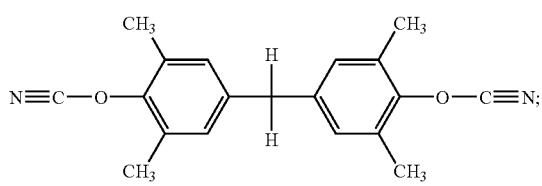

"AROCY" M-30

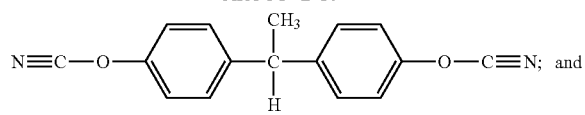

"AROCY" L-10

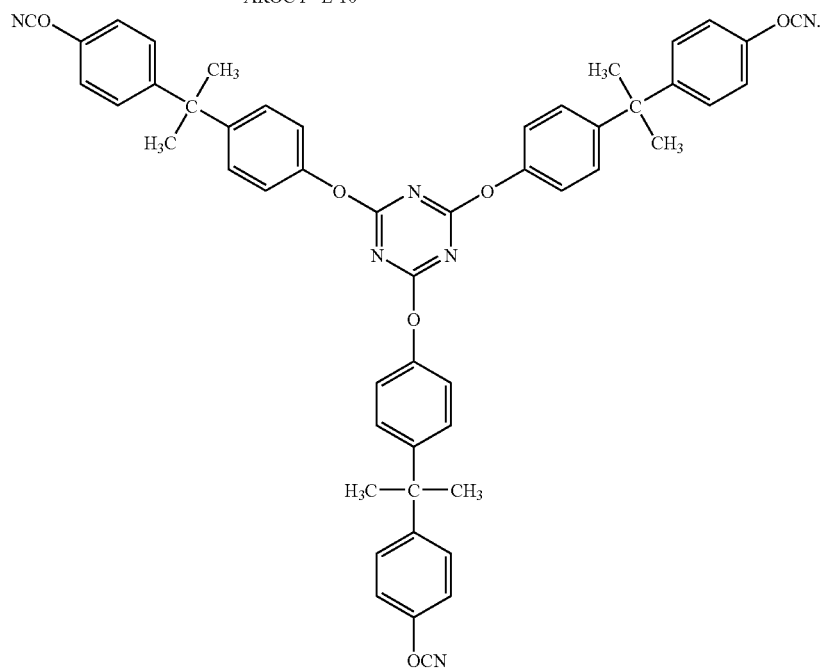

"AROCY" B-30

As stated above, the inventive composition also includes a (meth)acrylate monomer. Such monomers may be formulated with the cyanate esters to manipulate physical and thermal performances of the curable composition. As is convention, the term (meth)acrylate is used to refer to both acrylate and methacrylate-containing compounds.

Such monomers include monomethacrylates, dimethacrylates, trimethacrylates and tetramethacrylates.

dimethacrylate, bisphenol-A di(meth)acrylates, such as ethoxylated bisphenol-A (meth)acrylate ("EPIBMA"), trimethylol propane tri(meth)acrylate, trimethylol propane triacrylate and diglycerol tetra(meth)acrylate.

Of course, combinations of these (meth)acrylate monomers may also be used. In one embodiment, the (meth)acrylate has the general structural formula II.

$$H_2C=CGCO_2R^2 \qquad (II)$$

where G may be hydrogen, halogen or alkyl of 1 to about 4 carbon atoms, and $R^2$ may be selected from alkyl, cycloalkyl, alkenyl, cycloalkenyl, alkenyl, aralkyl or aryl groups 6 to about 16 carbon atoms, any of which may be optionally substituted or interrupted as the case may be with oxygen, halogen, carbonyl, hydroxyl, ester, carboxylic acid, urea, urethane, carbonate amine, amide, sulfur, sulfone and the like.

In another, particularly desired embodiment, the (meth) acrylates have general structural formula III:

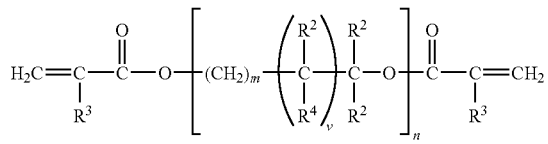

(III)

where $R^2$ may be selected from hydrogen, alkyl of 1 to about 4 carbon atoms, hydroxyalkyl of 1 to about 4 carbon atoms or

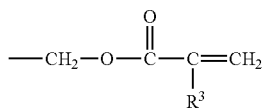

$R^3$ may be selected from hydrogen, halogen, and alkyl of 1 to about 4 carbon atoms;

$R^4$ may be selected from hydrogen, hydroxy and

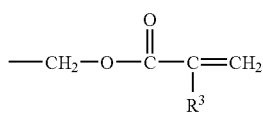

m is an integer equal to at least 1, e.g., from 1 to about 8 or higher, for instance, from 1 to about 4;

n is an integer equal to at least 1, e.g., 1 to about 20 or more; and v is 0 or 1.

The (meth)acrylate should be present in the compositions within the range of from about 1 percent by weight to about 60 percent by weight, desirably from about 5 percent by weight to about 50 percent by weight, such as from about 10 percent by weight to about 40 percent by weight, based on the total composition.

In another embodiment, the composition of the invention further comprises a maleimide. Generally, the maleimide has the general structural formula IV:

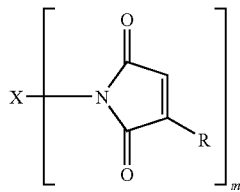

(IV)

where m is 1, 2, or 3,

R is independently selected from hydrogen or lower alkyl, and

X is a branched chain alkyl or alkylene species having at least 12 carbon atoms.

The maleimide may be in liquid or solid form. Alternatively, while mention is made of maleimides, itaconamides or nadimides may likewise be used.

In a desired embodiment, the maleimide functional groups are separated by a polyvalent radical having sufficient length and branching to render the maleimide containing compound a liquid. The maleimide compound may contain a spacer between maleimide functional groups comprising a branched chain alkylene between maleimide functional groups.

Desirably, the maleimide compound is a stearyl maleimide, oleyl maleimide, a biphenyl maleimide or a 1,20-bismaleimido-10,11-dioctyl-eixosane or combinations of the above.

The maleimide compound may be prepared by reaction of maleic anhydride with dimer amides or prepared from aminopropyl-terminated polydimethyl siloxanes, polyoxypropylene amines, polytetramethyleneoxide-di-p-aminobenzoates, or combinations thereof.

In another desired embodiment, "m" in maleimide structural formula IV is an integer between 1 and 15, and R is selected from hydrogen or a lower alkyl. X is a monovalent or polyvalent radical. Monovalent or polyvalent radicals include hydrocarbyl or substituted hydrocarbyl species typically having a range of about 6 up to about 500 carbon atoms. The hydrocarbyl species may be alkyl, alkenyl, alkynyl, cycloalkyl, cycloalkenyl, aryl, alkylaryl, arylalkyl, aryalkenyl, alkenylaryl, arylalkynyl and alkynylaryl, provided, however, that X can be aryl only when X is a combination of two or more different species.

Additionally, X may be a hydrocarbylene or substituted hydrocarbylene species typically having in the range of about 6 up to about 500 carbon atoms. Examples of hydrocarbylene species include but are not limited to alkylene, alkenylene, alkynylene, cycloalkylene, cycloalkenylene, arylene, alkylarylene, arylalkylene, arylalkenylene, alkenylarylene, arylalkynylene and alkynylarylene.

Further, in another embodiment, X may be a heterocyclic or substituted heterocyclic species typically having in the range of about 6 up to about 500 carbon atoms.

Additionally, in another desired embodiment, X may be a polysiloxane, polysiloxane-polyurethane block copolymers, or combinations of any of the above with a linker. Linkers include, but are not limited to, a covalent bond, —O—, —S—, —NR—, provided, however, that when the linker is —O—, —S—, or —NR—, the linker does not combine two alkyl, aryl or alkylene moieties. The linker may also be —O—C(O)—, provided, however, that when the linker is —O—C(O)—, it does not combine two alkylene moieties or two siloxane moieties. Additionally, the linker may be —O—C(O), —O—, —O—C(O)—NR—, provided, however, that when the linker is —O—C(O)—NR—, neither component is aryl or arylene, and the linker does not combine two alkylene moieties. Further, the linker may be —NR—C(O)—, —NR—C(O)—O—, —NR—C(O)—NR—, —S—C(O)—, —S—C(O)—O—, —S—C(O) —NR—, —O—S(O)$_2$—, —O—S(O)$_2$—O—, —O—S(O)2—NR—, —O—S(O)—, —O—S(O)—O—,—O—S(O)—NR—, —O—NR—C(O)—, —O—NR—C(O)—O—, —O—NR—C(O)—NR—, —NR—O—C(O)—, —NR—O—C(O)—NR—, —NR—O—C(O)—, —NR—O—C(O)—, O—, —NR—O—C(O)—NR—, —O—NR—C(S)—,—O—NR—C(S)—O—, —O—NR—C(S)—NR—, —NR—O—C(S)—, —NR—O—C(S)—O—, —NR—O—C(S)—

NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)2—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)2—NR—, —O—NR—S(O)—, —O—NR—S(O)—O—, —O—NR—S(O)—NR—, —O—NR—S(O)$_2$—O—, —O—NR—S(O)$_2$—NR—, —O—NR—S(O)$_2$—, —O—P(O)R$_2$—, —S—P(O)R$_2$—, or —NR—P(O)R$_2$—.

Maleimides should be present in the compositions within the range of from about 1 percent by weight to about 60 percent by weight, desirably from about 5 percent by weight to about 50 percent by weight, such as from about 10 percent by weight to about 40 percent by weight, based on the total composition.

Particularly desirably maleimides and nadimides include, but are not limited to,

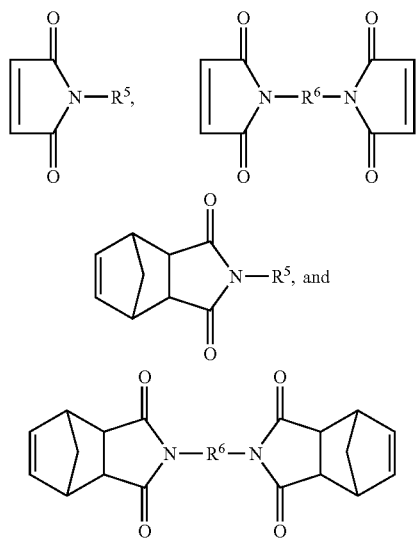

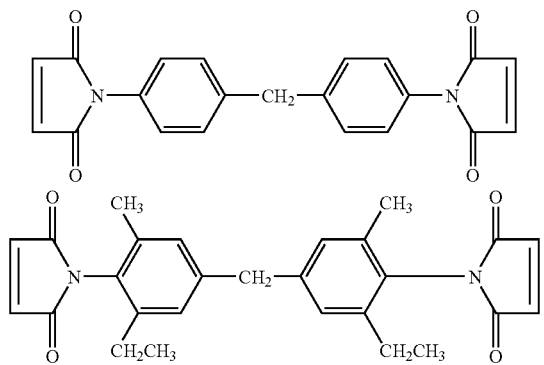

where $R^5$ and $R^6$ are each member selected from alkyl, aryl, aralkyl and alkaryl groups, having from about 6 to about 100 carbon atoms, with or without substitution or interruption by a member selected from silane, silicon, oxygen, halogen, carbonyl, hydroxyl, ester, carboxylic acid, urea, urethane, carbamate, sulfur, sulfonate and sulfone.

Other desirable maleimides include

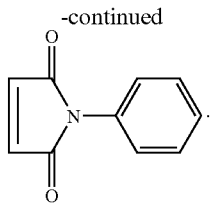

The present invention may also include, for example, maleimides, nadimides, itaconimides, vinyl compounds, allylated amides, and the like. In one embodiment, maleimides, nadimides, and itaconimides contemplated for use in the practice of the present invention include compounds having, respectively, the following structures V, VI, and VII:

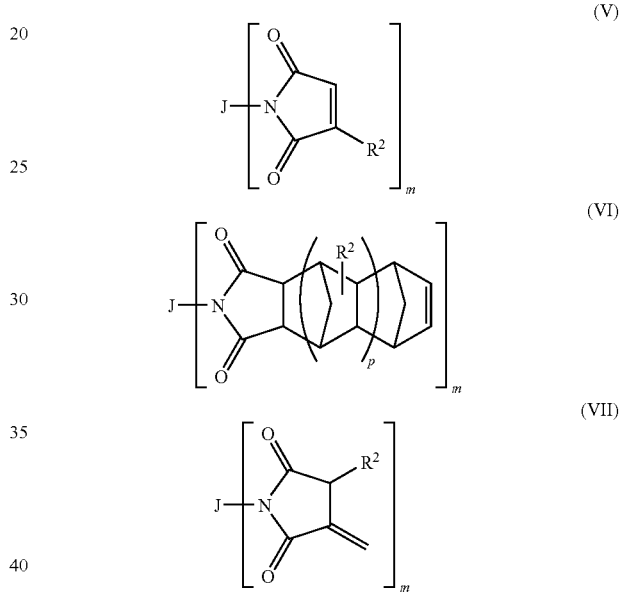

wherein m=1-15, p=0-15, each $R^2$ is independently selected from hydrogen or lower alkyl, and J is a monovalent or a polyvalent moiety comprising organic or organosiloxane radicals, and combinations of two or more thereof.

In one embodiment, J is a monovalent or a polyvalent radical selected from the group consisting of hydrocarbyl, substituted hydrocarbyl, heteroatom-containing hydrocarbyl, substituted heteroatom-containing hydrocarbyl, hydrocarbylene, substituted hydrocarbylene, heteroatom-containing hydrocarbylene, substituted heteroatom-containing hydrocarbylene, polysiloxane, polysiloxane-polyurethane block copolymer, and combinations of two or more thereof, optionally containing one or more linkers selected from a covalent bond, —O—, —S—, —NR—, —O—C(O)—, —O—C(O)—O—, —O—C(O)—NR—, —NR—C(O)—, —NR—C(O)—O—, —NR—C(O)—NR—, —S—C(O)—, —S—C(O)—O—, —S—C(O)—NR—, —S(O)—, —S(O)$_2$—, —O—S(O)2—, —O—S(O)2—O—, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—

C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)$_2$—NR—, —O—NR—S(O)—, —O—NR—S(O)—O—, —O—NR—S(O)—NR—, —O—NR—S(O)$_2$—O—, —O—NR—S(O)2—NR—, —O—NR—S(O)$_2$—, —O—P(O)R$_2$—, —S—P(O)R$_2$—, and —NR—P(O)R$_2$—, where each R is independently hydrogen, alkyl or substituted alkyl, and combinations of any two or more thereof.

When one or more of the above described monovalent or polyvalent groups contain one or more of the above described linkers to form the "J" appendage of a maleimide, nadimide or itaconimide group, as readily recognized by those of skill in the art, a wide variety of linkers can be produced, such as, for example, oxyalkyl, thioalkyl, aminoalkyl, carboxylalkyl, oxyalkenyl, thioalkenyl, aminoalkenyl, carboxyalkenyl, oxyalkynyl, thioalkynyl, aminoalkynyl, carboxyalkynyl, oxycycloalkyl, thiocycloalkyl, aminocycloalkyl, carboxycycloalkyl, oxycloalkenyl, thiocycloalkenyl, aminocycloalkenyl, carboxycycloalkenyl, heterocyclic, oxyheterocyclic, thioheterocyclic, aminoheterocyclic, carboxyheterocyclic, oxyaryl, thioaryl, aminoaryl, carboxyaryl, heteroaryl, oxyheteroaryl, thioheteroaryl, aminoheteroaryl, carboxyheteroaryl, oxyalkylaryl, thioalkylaryl, aminoalkylaryl, carboxyalkylaryl, oxyarylalkyl,thioarylalkyl, aminoarylalkyl, carboxyarylalkyl, oxyarylalkenyl, thioarylalkenyl, aminoarylalkenyl, carboxyarylalkenyl, oxyalkenylaryl, thioalkenylaryl, aminoalkenylaryl, carboxyalkenylaryl, oxyarylalkynyl, thioarylalkynyl, aminoarylalkynyl, carboxyarylalkynyl, oxyalkynylaryl, thioalkynylaryl, aminoalkynylaryl or carboxyalkynylaryl, oxyalkylene, thioalkylene, aminoalkylene, carboxyalkylene, oxyalkenylene, thioalkenylene, aminoalkenylene, carboxyalkenylene, oxyalkynylene, thioalkynylene, aminoalkynylene, carboxyalkynylene, oxycycloalkylene, thiocycloalkylene, aminocycloalkylene, carboxycycloalkylene, oxycycloalkenylene, thiocycloalkenylene, aminocycloalkenylene, carboxycycloalkenylene, oxyarylene, thioarylene, aminoarylene, carboxyarylene, oxyalkylarylene, thioalkylarylene, aminoalkylarylene, carboxyalkylarylene, oxyarylalkylene, thioarylalkylene, aminoarylalkylene, carboxyarylalkylene, oxyarylalkenylene, thioarylalkenylene, aminoarylalkenylene, carboxyarylalkenylene, oxyalkenylarylene, thioalkenylarylene, aminoalkenylarylene, carboxyalkenylarylene, oxyarylalkynylene, thioarylalkynylene, aminoarylalkynylene, carboxy arylalkynylene, oxyalkynylarylene, thioalkynynlarylene, aminoalkynynlarylene, carboxyalkynylarylene, heteroarylene, oxyheteroarylene, thioheteroarylene, aminoheteroarylene, carboxyheteroarylene, heteroatom-containing di- or polyvalent cyclic moiety, oxyheteroatom-containing di- or polyvalent cyclic moiety, thioheteroatom-containing di- or polyvalent cyclic moiety, aminoheteroatom-containing di- or polyvalent cyclic moiety, carboxyheteroatom-containing di- or polyvalent cyclic moiety, disulfide, sulfonamide, and the like.

In another embodiment, maleimides, nadimides, and itaconimides contemplated for use in the practice of the present invention have the structures V, VI, or VII, where m=1-6, p=0-6, and J is (a) saturated straight chain alkyl or branched chain alkyl, optionally containing optionally substituted aryl moieties as substituents on the alkyl chain or as part of the backbone of the alkyl chain, and wherein the alkyl chains have up to about 20 carbon atoms; (b) a siloxane having the structure —(C(R3)2)d—[Si(R4)2—O]f—Si(R4)2—(C(R3)2)e—, —(C(R3)2)d—C(R3)—C(O)O—(C(R3)2)d—[Si(R4)2—O]Si(R4)2—(C(R3)2)e—O(O)C—(C(R3)2)e—, or —(C(R3)2)d—C(R3)—O(O)C—(C(R3)2)d—[Si(R4)2—O]f—Si(R4)2—(C(R3)2)e—C(O)O—(C(R3)2)e—, where each R3 is independently hydrogen, alkyl or substituted alkyl, each R4 is independently hydrogen, lower alkyl or aryl, d=1-10, e=1-10, and f=1-50; (c) a polyalkylene oxide having the structure

[(CR2)$r$—O—]$f$—(CR2)$s$— where each R is independently hydrogen, alkyl or substituted alkyl, r=1-10, s=1-10, and f is as defined above; (d) aromatic groups having the structure:

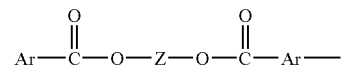

where each Ar is a monosubstituted, disubstituted or trisubstituted aromatic or heteroaromatic ring having in the range of 3 up to 10 carbon atoms, and Z is (i) saturated straight chain alkylene or branched chain alkylene, optionally containing saturated cyclic moieties as substituents on the alkylene chain or as part of the backbone of the alkylene chain, or (ii) polyalkylene oxides having the structure:

—[(CR2)$r$—O—]$q$—(CR2)$s$— where each R is independently defined as above, r and s are each defined as above, and q falls in the range of 1 up to 50; (e) di- or tri-substituted aromatic moieties having the structure:

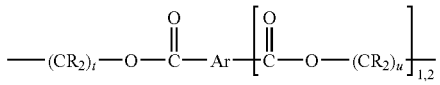

where each R is independently defined as above, t falls in the range of 2 up to 10, u falls in the range of 2 up to 10, and Ar is as defined above; (f) aromatic groups having the structure:

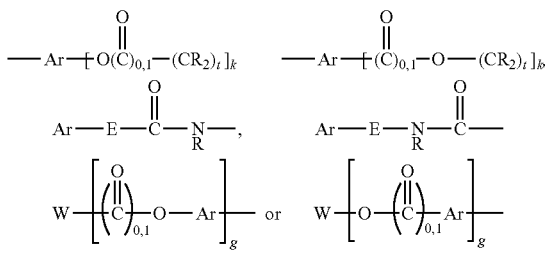

where each R is independently defined as above, t=2-10, k=1, 2 or 3, g=1 up to about 50, each Ar is as defined above, E is —O— or —NR$_5$—, where R$_5$ is hydrogen or lower alkyl; and W is (i) straight or branched chain alkyl, alkylene, oxyalkylene, alkenyl, alkenylene, oxyalkenylene, ester, or polyester, (ii) a siloxane having the structure —(C(R$_3$)$_2$)$d$—[Si(R$_4$)$_2$—O]$f$—Si(R$_4$)$_2$—(C(R$_3$)$_2$)$e$—, —(C(R$_3$)$_2$)$d$—C(R$_3$)—C(O)O—(C(R$_3$)$_2$)$d$—[Si(R$_4$)$_2$—O]$f$—Si(R$_4$)$_2$—(C(R$_3$)$_2$)$e$—O(O)C—(C(R$_3$)$_2$)$e$—, or —(C(R$_3$)$_2$)$d$—C(R$_3$)—O(O)C—(C(R$_3$)$_2$)$d$—[Si(R$_4$)$_2$—O]$f$—Si(R$_4$)$_2$—(C(R$_3$)$_2$)$e$—C(O)O—(C(R$_3$)$_2$)$e$—, where each R3 is independently hydrogen, alkyl or substituted alkyl, each $R_4$ is independently hydrogen, lower alkyl or aryl, d=1-10, e=1-10, and f=1-50; or (iii) a polyalkylene oxide having the structure:

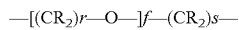

where each R is independently hydrogen, alkyl or substituted alkyl, r=1-10, s=1-10, and f is as defined above; optionally containing substituents selected from hydroxy, alkoxy, carboxy, nitrile, cycloalkyl or cycloalkenyl; (g) a urethane group having the structure:

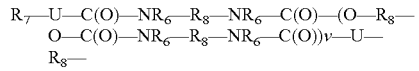

where each $R_6$ is independently hydrogen or lower alkyl; each $R_7$ is independently an alkyl, aryl, or arylalkyl group having 1 to 18 carbon atoms; each $R_8$ is an alkyl or alkyloxy chain having up to about 100 atoms in the chain, optionally substituted with Ar; U is —O—, —S—, —N(R)—, or —P(L)1,2- where R as defined above, and where each L is independently =O, =S, —OR or —R; and v=0-50; (h) polycyclic alkenyl; or (i) mixtures of any two or more thereof.

In another embodiment, J is of sufficient length to render liquid the maleimide, nadimide, itaconimide or combinations of two or more thereof. In some such embodiments, m=1, 2 or 3, and J is a branched chain alkyl, alkylene or alkylene oxide of sufficient length and branching to render liquid the maleimide, nadimide, itaconimide or combinations of two or more thereof.

Particularly desirable maleimides, nadimides, and itaconimides contemplated for use in the practice of the present invention include, for example, maleimides, nadimides, and itaconimides having the following structures:

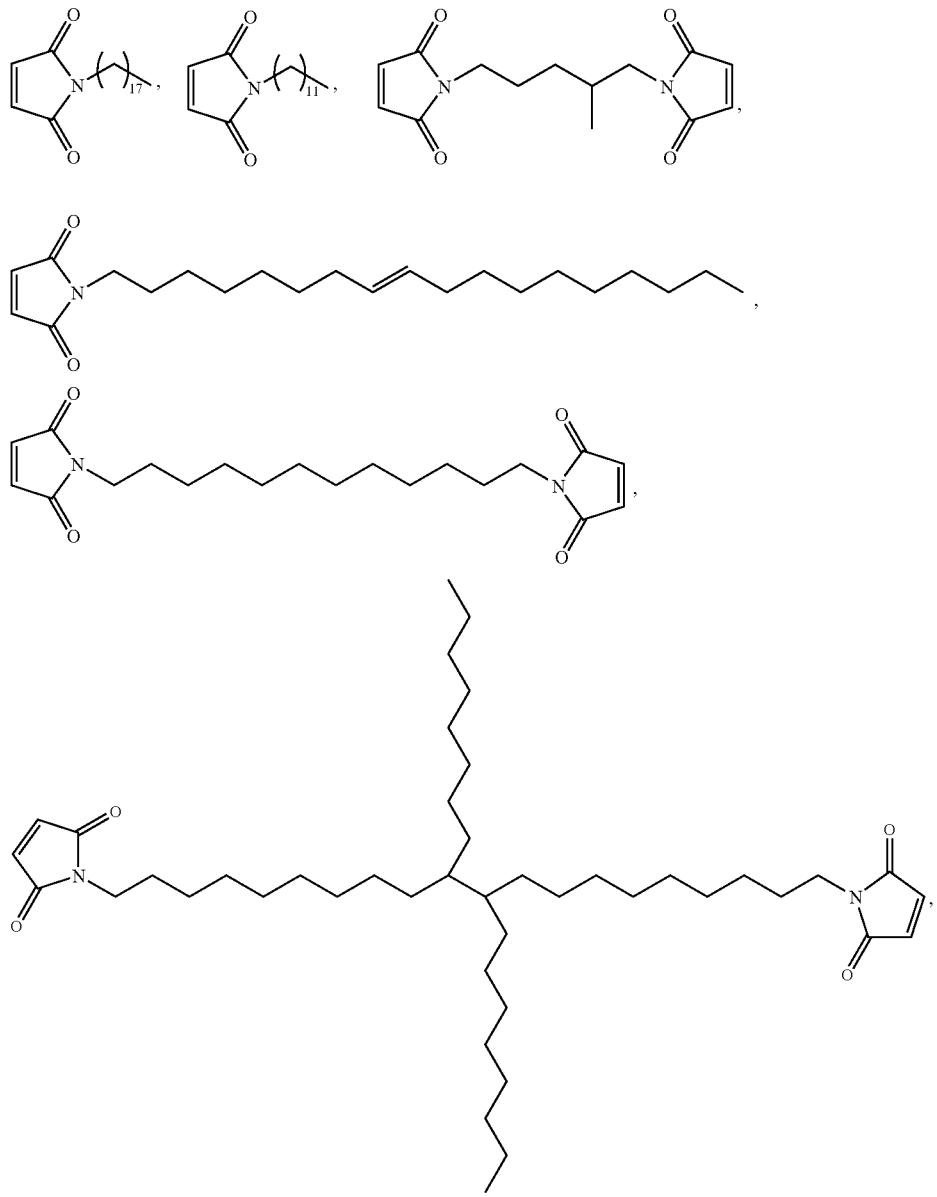

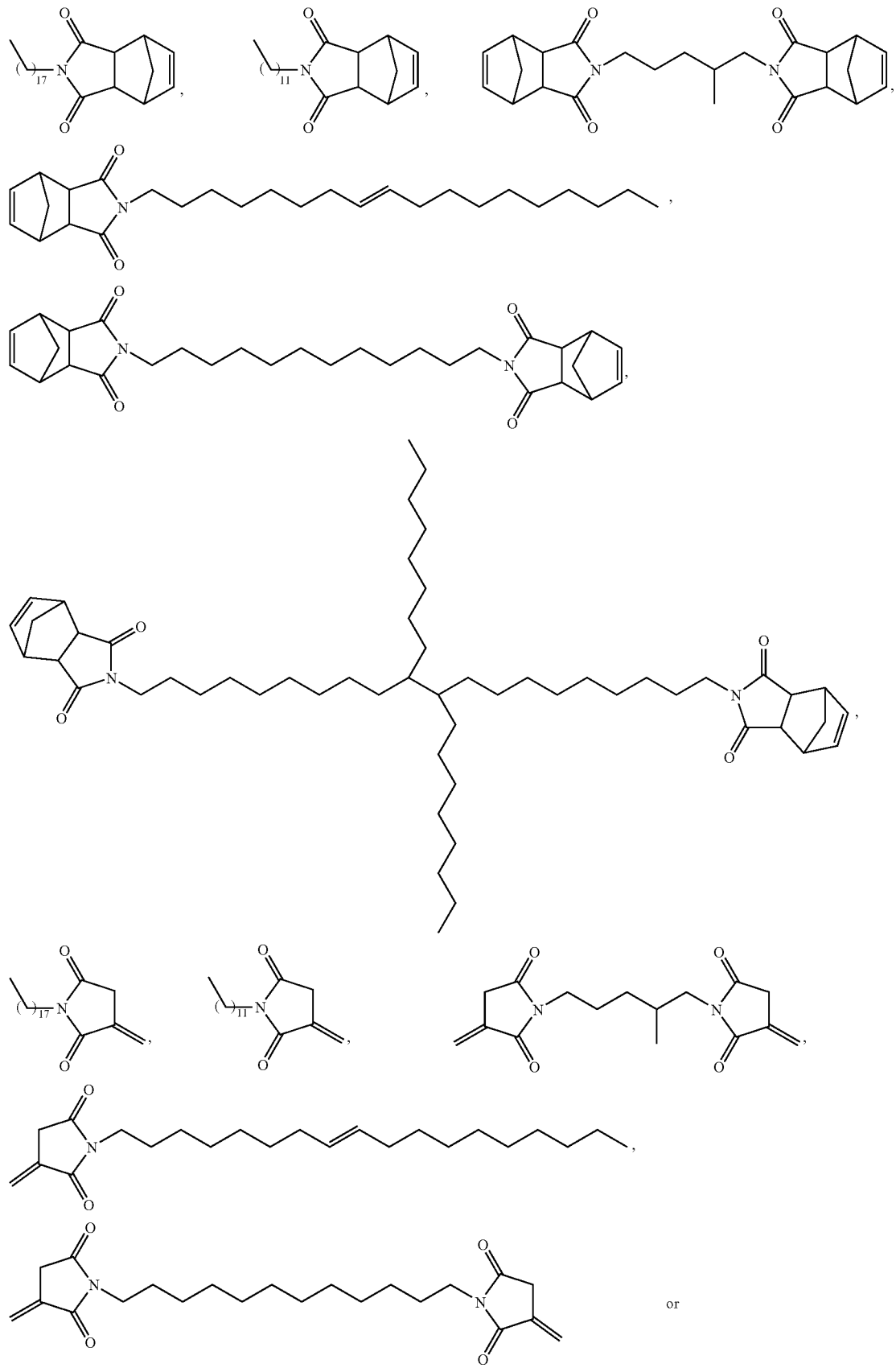

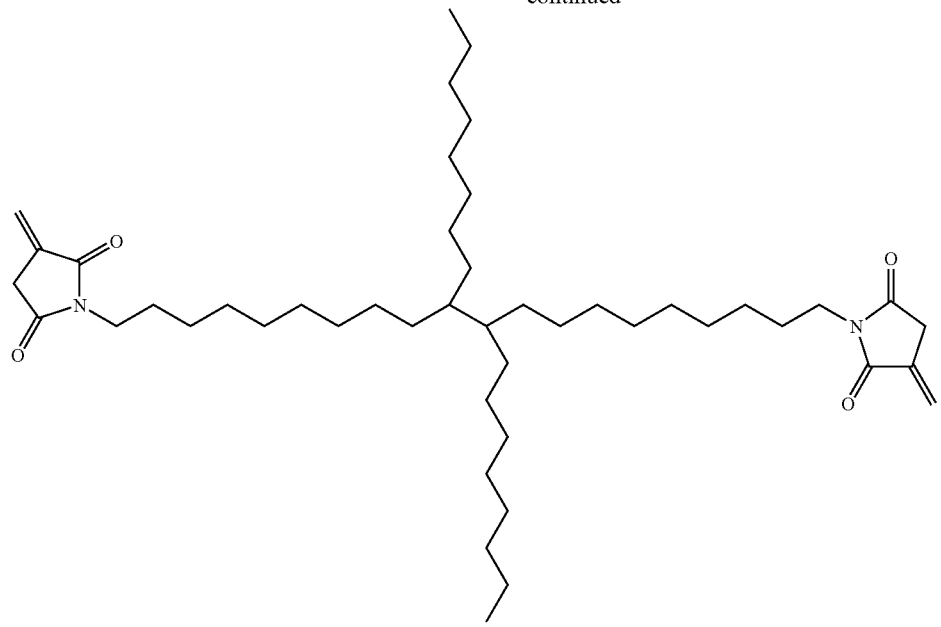

In addition to (meth)acrylates and maleimides, nadimides, and itaconimides, the curable cyanate ester composition of the invention may further include initiators, accelerators, stabilizers, modifiers and fillers.

A number of well known initiators of free radical polymerization may be incorporated in the present invention. Among those included, without limitation, are hydroperoxides such as cumene hydroperoxide ("CHP"), t-butylhydroperoxide ("TBH"), p-menthane hydroperoxide, diisopropylbenzene hydroperoxide, pinene hydroperoxide, methyl ethyl ketone hydroperoxide, and tertiary butyl perbenzoate.

While the useful amounts of peroxide compounds typically range from about 0.1 to about 10% by weight of the total composition, the present invention achieves its speed of cure when about 1% by weight of the peroxide is used along with a substantially equal amount of the reducing agent, e.g., saccharin. Thus, for the cure speed advantages discussed herein, the range of peroxide to peroxide reducing agent (e.g., CHP) is desirably about 0.05 to 5 weight percent and even more desirably about 0.1 to 3 weight percent.

Examples of useful accelerator compounds include 1-acetyl-2-phenyl hydrazine, 1-acetyl-2(p-tolyl)para-toluene sulfonyl hydrazide, 1-formyl-2-phenyl hydrazine and combinations thereof. As previously noted, the ratio of peroxide to accelerator is desirably about 2:1. While the amount of accelerator can be proportionately varied to the amount of peroxide present, to achieve the aforementioned desired physical properties of the anaerobic adhesive composition the accelerator is desirably present in about 0.5% by weight of the total composition.

Stabilizers and inhibitors may also be employed as well as chelating agents to control and prevent premature peroxide decomposition and polymerization. Among those useful inhibitors include phenols such as hydroquinone and quinones. Chelating agents may also be useful. An example of a useful chelating agent is the tetrasodium salt of ethylenediamine tetraacetic acid (EDTA).

Modifiers may be used to make the viscosity of the curable composition appropriate to the application. An application that requires penetration into close-fitting parts should have a very low viscosity, while a product with large, loose-fitting parts should have a high viscosity. Polymeric organic and or inorganic fillers could be used for increasing viscosity if desired. Polymeric fillers such as polymethacrylates, cellulose esters, butadiene-styrene copolymers, acrylonitrile-butadiene-styrene copolymers, poly (vinyl chloride), copolymers of vinyl chloride and vinyl acetate, poly(vinyl acetate), cellulose ethers, polyesters, polyurethanes and other thermoplastic resins may be used to control the flow characteristics of the composition of the invention.

If the curable composition of the invention is being used with components that need to be disassembled for repair or replacement, relatively low strength is required. In this case, liquid plasticizers may be incorporated into the curable composition of the invention. In one embodiment, the use of a low molecular weight polyester is used for this purpose.

In another embodiment, toughness may be enhanced by the addition of a reactive elastomer.

Further, dyes may be incorporated into the composition of the invention. Dyes can assist in the identification and inspection of the products. Automated inspection procedures are made possible with dyes that fluoresce under ultraviolet light. Titanium dioxide pigments can make the cured composition of the invention more visible.

Solid fillers may also optionally be added to the composition of the invention for various purposes. Powdered graphite, polytetrafluoroethylene and polyethylene can function as lubricants in threadlocking compounds. This lubrication can prevent galling in close-fitting pipe threads. Lubricating additives in thread-locking compounds can provide control of the clamping force exerted by a fastener at a given tightening torque.

When maleimides, nadimides, and itaconimides are incorporated into the composition of the invention, desired fillers may include, but not be limited to, aluminum nitride, boron nitride, alumina, silicon dioxide, polytetrafluoroethylene and the like.

In addition to the composition described above, the invention also provides a curable composition derived from the reaction product of a cyanate ester composition (that is free of any added metallic catalyst) and a (meth)acrylate monomer.

Desirably, the cyanate ester compound is according to formula 1 or any cyanate ester compound as described above. The (meth)acrylate monomer is likewise as described above.

In another embodiment, the reaction product includes maleimides, nadimides, and itaconimides as described above.

Further, this reaction product may also optionally contain initiators, accelerators, stabilizers, and the like, as previously described.

The reaction product is formed, in a desired embodiment, at room temperature. The time for curing can occur after 20, 24, 30, 40, 50, 60 or 72 hours or more.

The active metallic surfaces that may be used with the inventive compositions to form the reaction product include but are not limited to zinc, copper, cadmium, iron, nickel alloys thereof, steel and stainless steel.

In a desirable embodiment, the active metallic surface is an oily zinc phosphate plated steel surface.

In addition to the above, the invention also provides a method for bonding metallic surfaces. This method includes providing active metallic mating surfaces and then applying to at least one of the mating surfaces, a curable composition including a cyanate ester compound as described above. The surfaces are then mated and the composition is allowed to cure. The metal surfaces act as catalyst. Hence, no free metallic catalyst is necessary to add to the curable composition.

The active metallic surfaces are those as described above and may be oily active metallic surfaces including but not limited to steel, stainless steel, zinc dichromated plated, nickel plated and cadmium plated steel. Desirably, oily zinc phosphate plated steel is used. Also as described above, the composition used in this method may optionally include (meth)acrylate monomers, and further include initiators and accelerators.

Also provided herein is an article of manufacture. The article of manufacture may in one embodiment be a threaded fastener. Fasteners include, but are not limited to such engineering parts as nuts, bolts, screws, threaded nails and the like, or parts such as pipe joints which may be threaded.

In any case, the article of manufacture includes substrates having an active metallic surface and a cured composition therebetween to adhesively join the substrates to one and the other. The cured compositions comprises a cyanate ester as described herein.

Desirably, the active metallic surface includes, but is not limited to, zinc, copper, cadmium, iron, nickel, alloys thereof, steel and stainless steel. More desirably, the active metallic surface is an oily active metallic surface. Yet, even more desirably, the active metallic surface is oily zinc phosphate plated steel.

Further, the invention provides a method for producing threadlocking matable parts. In this method, a composition having a cyanate ester as described above and optionally, (meth)acrylate and/or maleimide that is free of added metallic catalyst is applied to at least a portion of an engagement surface of a matable part which is matably engageable with a complementary engagement structure. That is to say, the inventive composition may be contacted with a nut. After engagement of, for example, the nut and the bolt, the matable parts are threadlocked.

Optionally, the addition of (meth)acrylate and optionally initiators, stabilizers and the like can allow for an anaerobic cure upon the engagement of the matable parts.

As described above, maleimides (embracing itaconamides and nadimides, as well) may also be incorporated into the inventive composition for this threadlocking aspect of the invention.

The invention also provides a method of forming a bond. This method involves applying a composition having the reaction product of a cyanate ester compound without added metallic catalyst to an active metallic surface, and subjecting the composition to conditions suitable to effectuate cure. Such conditions include room temperature cure for at least 20, 24, 30, 40, 50, 60 or 72 hours or more. Additional suitable conditions are described in the Example section below.

The bond is formed by the cure of the cyanate ester composition. One general example of such a reaction is depicted below as structure formula VIII:

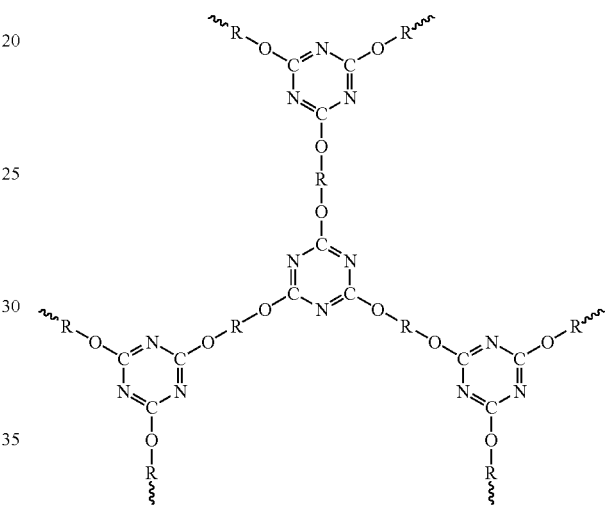

(VIII)

In this embodiment, R is an aromatic-nucleus containing residue. R may likewise be an ester functional group.

The curable composition including a cyanate ester without added metallic catalyst used for bonding may further include (meth)acrylates, maleimides, nadimides, and itaconimides and, other additives as disclosed hereinabove. The active metallic surface may be zinc, copper, cadmium, iron, nickel and alloys thereof. The active metallic surface may be oily or degreased. Desirably, the surface is oily.

Further, the invention provides a method for multi-staging the cure of curable compositions. This method results in a composition having increased thermal resistance. The method includes combining a (meth)acrylate monomer that is capable of curing at ambient temperature with a cyanate ester composition. The cyanate ester component does not contain any added metallic catalyst. Additionally, a maleimide is combined with the other three components. The cyanate ester component is able to cure at ambient temperature in the presence of an active metallic surface. The maleimide is capable of curing at 200° C. or greater and may impart hot strength up to 600° C. or more. The (meth)acrylate monomer, cyanate ester and maleimide components are described herein. Optionally, stabilize, initiators, etc., may also be combined in this method.

The invention also provides a multi-staging curable composition. This multi-staging curable composition results in increased thermal resistance and hot strength. The composition includes an anaerobically curable monomer that is capable of curing at room temperature. Desirably, the monomer is a (meth)acrylate as describe herein. Additionally, the composition provides a cyanate ester composition without added metallic catalyst that is capable of curing at ambient temperature when contacted with an active metallic surface. Generally, cyanate ester compositions cure at a slower rate than those with (meth)acrylate. The cyanate ester used for this multi-staging curable composition is as described herein. The multi-stage composition also includes a maleimide. The addition of a maleimide will enable the composition to obtain increased thermal resistance at temperatures greater than 200° C. In one embodiment, these compositions will show good cure strength at temperatures as high as 600° C. or more when allowed to age for a time of greater than 5 hours, desirably greater than 24 hours, even more desirably greater than 2 days and yet even more desirably greater than 4 days.

EXAMPLES

Example 1

Curable Cyanate Ester Compositions

Four curable cyanate ester compositions were prepared without added metallic catalyst using the components and amounts indicated below in Table I.

The formulations were prepared with the cyanate ester L-10 or both L-10 and the cyanate ester B-30.

Initially, the compositions were prepared by adding the appropriate amounts of a cyanate ester compound at room temperature into a mechanical mixer. Additional components, such as stabilizers, were then added (if any) followed by cure-inducing components (if any). The components were mixed for an appropriate period of time to allow for dissolution and/or dispersion, as the case may be, of the solid components.

TABLE 1

CYANATE ESTER COMPOSITIONS

| Composition | Cyanate Ester Component (Wt. %) | (Meth)acrylate Component | Cure Inducing Component (Wt. %) | Other (Wt. %) |
|---|---|---|---|---|
| A | L-10 (98%) | — | — | phenol (2%) |
| B | L-10 (95%) | — | Saccharin (1%) CHP[2] (2%) | NQ[3] (1%) EDTA (1%) |
| C | L-10 (94%) | — | Saccharin (1%) APH[1] (2%) CHP[2] (2%) | HQ[3] (1%) EDTA (1%) |
| D | L-10 (75%) B-30 (25%) | — | — | — |

[1]acetyl phenylhydrazine
[2]cumene hydroperoxide
[3]naphthoquinone

Example 2

Application and Ambient Temperature Cure of Curable Cyanate Ester Compositions

Compositions A-C, set forth above in Table I, were applied to nuts and bolts comprised of degreased and oily zinc phosphate fasteners (nuts and bolts). Composition D was applied to degreased steel and oily zinc phosphate fasteners. The compositions were tested for their cure speed, as a function of threadlocking strength (breakloose/prevail [in-lbs]) measured after 24 hour cure at room temperature.

The compositions were applied in equal amounts to the threads of the bolts and mated with the nut using a pretorque of 5 Newton-meters (Nm) (44 in.-lbs).

The results of these tests are shown below in Table II.

TABLE II

| | Br. [in. lbs] Degreased Zn Phosphate | Br. [in. lbs] Oily Zn Phosphate |
|---|---|---|
| A | 37 | 52 |
| B | 33 | 67 |
| C | 33 | 68 |
| D | 28 (on degreased steel) | 55 |

The results depicted in Table II show that all the compositions provided useful break strength properties in the absence of added metallic catalyst, oily zinc phosphate surfaces as compared to degreased substrates. This cure on oily surfaces occurred despite that fact that none of the compositions contained metallic catalyst.

Unexpectedly, these cyanate ester compositions resulted in an improved break strength when applied to "hard to bond" oily zinc phosphate. This result shows that, not only may degrease substrates be an unnecessary step, but break strength may be significantly improved by not degreasing.

Example 3

(Meth)acrylate Containing Cyanate Ester Compositions

Curable cyanate compositions were prepared as above except that a (meth)acrylate component was added to test the effect of the addition of this component on the inventive compositions. The components and amounts are indicated below in Table III.

For comparative purposes, Composition E only contained a (meth)acrylate based composition and Composition F only contained a cyanate ester based composition. Compositions G and H, however, contained varying amounts of both cyanate esters and methacrylates.

TABLE III

CYANATE ESTER/PEGMA COMPOSITIONS

| Composition | Cyanate Ester Component (Wt. %) | Methacrylate Component (Wt. %) | Cure Inducing Composition (Wt. %) | Other (Wt. %) |
|---|---|---|---|---|
| E* Control | — | PEGMA (95%) | Saccharin (1%) APH[1] (0.5%) CHP[2] (2%) | EDTA (1.0%) NQ (0.5%) |
| F** Control | L-10 (99%) | | | |
| G | Composition E (50%) | Composition F (50%) | See Composition E/F | See Composition E |
| H | Composition E (25%) | Composition F (75%) | See Composition E/F | See Composition E |

[1]acetyl phenylhydrazine
[2]cumene hydroperoxide
*meth(acrylate) only control
**cyanate ester only control

Example 4

Application and Ambient Temperature Cure of (Meth)acrylate/Cyanate Ester Containing Compositions Compositions E-H set forth above in Table III were applied to oily zinc phosphate nuts and bolts. The Compositions were tested for their cure speed, as measured by threadlocking strength (breakloose/prevail [in-lbs]) at room temperature for 24 hours.

The results of these tests are shown below in Table IV.

TABLE IV

CYANATE ESTER AND PEGMA BASED FORMULATIONS
CURE STRENGTH IN 24 HOURS
(Breakloose/Prevail [in.-lbs.])

| Composition | Oily zinc phosphate |
| --- | --- |
| E* Control | 229/260 |
| F** Control | 41/1 |
| G | 111/66 |
| H | 69/14 |

*meth(acrylate) control
**cyanate ester only control

These data indicate that all four formulations provide some 24 hour cure strength at room temperature on oily zinc phosphate. At room temperature, Composition E, which only contained (meth)acrylate, resulted in the greatest break strength and prevail.

Example 5

Application and Hot Strength of (Meth)acrylate/Cyanate Ester Containing Compositions The oily zinc phosphate fasteners assembled with Composition E-H were evaluated for their thermal performance after curing at room temperature. Thereafter, they were subjected to elevated temperatures of about 200° C. for a period of one or two weeks. Tests for break strength and prevailing torque were performed. For each Composition, the tests were taken at 200° C. The results of these data are shown in Tables V(a) and (b).

TABLE V(a)

HOT STRENGTH

| Compositions | 200° C., 1 week, test 200 C<br>Oily Zn Phosphate |
| --- | --- |
| E* Control | 71/23 |
| F** Control | 142/7 |
| G | 113/65 |
| H | 139/60 |

*meth(aerylate) control
**cyanate ester only Control

TABLE V(b)

HOT STRENGTH

| Compositions | 200° C., 2 wk. test 200° C.<br>Oily Zn Phosphate |
| --- | --- |
| E* Control | 33/26 |
| F** Control | 151/7 |
| G | 120/84 |
| H | 148/79 |

*meth(acrylate) control
**cyanate ester only control

As is evident from these data, cyanate ester containing compositions result in higher breakloose strength in comparison to (meth)acrylate-only containing compositions (Composition E).

Additionally, prevail scores are higher for those compositions containing both (meth)acrylate and cyanate esters (Compositions G and H) in comparison to those compositions comprised only of cyanate ester or only of (meth)acrylates. Further, break strength and prevail increased slightly after two weeks in such compositions.

Composition E, which only contains (meth)acrylate, results in decreased breakloose/prevail over time. Prevail values for cyanate ester-only containing compositions does not change over time, but breakloose values are increased. Further, compositions comprised only of cyanate esters show higher breakloose strengths at both one and two weeks in comparison to all of the other compositions.

FIG. 1 depicts the results from Tables V(a) and V(b) in comparison to a 24 hour room temperature cure in graphic form.

Example 6

Application and Heat Aged Strength Retention of (Meth)acrylate/Cyanate Ester Containing Compositions The oily zinc phosphate fasteners were assembled with Composition E-H and evaluated for their heat aged strength retention after curing at room temperature. Thereafter, they were subjected to elevated temperatures of about 200° C. for a period of one or two weeks. Tests for break strength and prevailing torque were performed. For each Composition, the tests were taken at room temperature. The results of these data are shown in Tables VI (a) and (b).

TABLE VI(a)

HEAT AGED STRENGTH RETENTION

| Compositions | 200° C., 1 week, test RT***<br>Oily Zn Phosphate |
| --- | --- |
| E* | 97/68 |
| F** | 141/5 |
| G | 185/123 |
| H | 168/157 |

*meth(acrylate) control
**cyanate ester only control
***Room Temperature

TABLE VI(b)

HEAT AGED STRENGTH RETENTION

| Compositions | 200° C., 2 weeks, test RT Oily Zn Phosphate |
|---|---|
| E* | 66/21 |
| F** | 140/11 |
| G | 152/130 |
| H | 188/121 |

*meth(acrylate) control
**cyanate ester only control
***Room Temperature

As is evident from these data, cyanate ester containing compositions result in higher breakloose strength than those compositions not containing cyanate esters.

Compositions G and H, comprised of both (meth)acrylate and cyanate esters result in higher breakloose and prevail than those compositions comprised of only one type of monomer.

FIG. 2 depicts these results from Tables VI(a) and VI(b) to those of a 24 hour room temperature cure.

Example 7

Curable Cyanate Ester Compositions Comprised of Different Types of Cyanate Esters Curable cyanate ester compositions of the invention were prepared using different cyanate ester compositions. Whereas, in the previous Example, the cyanate compositions were comprised entirely of L-10, Compositions for this Example were prepared using mixtures of L-10 and PEGMA or B-30 and PEGMA. PEGMA alone was used as a control.

The amounts of these formulations are described in Table VII below:

TABLE VII

| Composition | Cyanate Esters | (Meth)acrylate |
|---|---|---|
| I* Control | — | PEGMA (100%) |
| J | B-30 (50%) | PEGMA (50%) |
| K | L-10 (50%) | PEGMA (50%) |

*PEGMA only control

Example 8

Application and Ambient Cure of the Cyanate Ester Containing Compositions of Example 7

The three formulations from Example 7 were tested on fasteners comprised of degreased steel nuts and bolts and oily zinc phosphate nuts and bolts. Break loose and prevailing torque were tested at room temperature after 72 hours.

The values for these data are below in Table VIII.

TABLE VIII

CURE STRENGTH AT ROOM TEMPERATURE AFTER 72 HOURS

| | Room Temperature Breakloose Room Temperature Cure at 72 hours | |
|---|---|---|
| Compositions | Degreased Br./PR (in-lbs) | Oily Zn Phosphate Br./PR (in-lbs) |
| I* Control | 224/323 | 211/245 |
| J | 116/105 | 180/96 |
| K | 115/33 | 137/95 |

*PEGMA only control

These data indicate that all three formulations function at room temperature on either substrate. Compositions J and K, however, result in lower break strength and prevail values in comparison to the control.

Compositions I and J showed increased breakloose values on oily zinc phosphate substrates in comparison their values resulting from application to degreased steel. Composition J, comprised of B-30 and PEGMA, outperforms L-10 and PEGMA (Composition K) in terms of breakloose strength on both degreased steel and oily zinc phosphate.

Example 9

Application and Hot Strength of the Cyanate Ester Containing Compositions of Example 7

Both the steel fasteners and the oily zinc phosphate fasteners assembled with Compositions I-J were evaluated for their thermal performance after curing at room temperature for 72 hours. Thereafter, they were subjected to elevated temperatures of about 200° C. for a period of two or three weeks. Tests for break strength and prevailing torque were performed. For each composition, the tests were taken at 200° C. The results of these data are shown in Table IX(a) and (b).

TABLE IX(a)

HOT STRENGTH

| | 200° C., 2 weeks Hot Strength | |
|---|---|---|
| Compositions | Degreased Br./PR (in-lbs) | Oily Zn Phosphate Br./PR (in-lbs) |
| I* | 111/94 | 70/32 |
| J | 162/160 | 130/100 |
| K | 155/154 | 111/58 |

*(meth)acrylate only control

TABLE IX(b)

HOT STRENGTH

| | 200° C., 3 weeks Hot Strength | |
|---|---|---|
| Compositions | Degreased Br./PR (in-lbs) | Oily Zn Phosphate Br./PR (in-lbs) |
| I* Control | 96/35 | 75/15 |
| J | 164/110 | 159/69 |
| K | 174/141 | 80/50 |

*PEGMA only control

As is evident from these data, cyanate ester containing compositions result in higher breakloose strength and prevail than those not containing cyanate esters. This result occurs whether or not the substrate is oily or degreased.

Example 10

Application and Heat Aged Strength Retention of the Cyanate Ester Containing Compositions of Example 7

Both steel and oily zinc phosphate fasteners were assembled with Compositions I-J and evaluated for their heat aged strength retention after curing at room temperature for 72 hours. Thereafter, they were subjected to elevated temperatures of about 150° C. for two hours followed by 200° C. for a period of one hour. Thereafter, they were subjected to elevated temperatures of about 200° C. for a period two, three weeks or six weeks. Tests for break strength and prevailing torque were performed. For each composition, the tests were taken at room temperature. The results of these data are shown in Table X(a)-(d).

TABLE X(a)

HEAT AGED STRENGTH RETENTION (Tested at RT)

150° C. for 2 hours/200° C. 1 hour RT Breakloose

| Compositions | Degreased Br./PR (in-lbs) | Oily Zn Phosphate Br./PR (in-lbs) |
|---|---|---|
| I* Control | 161/315 | 190/288 |
| J | 230/440 | 236/246 |
| K | 308/414 | 175/213 |

*PEGMA only control

TABLE X(b)

HEAT AGED STRENGTH RETENTION (Tested at RT)

200° C., 2 weeks

| Compositions | Degreased Br./PR (in-lbs) | Oily Zn Phosphate Br./PR (in-lbs) |
|---|---|---|
| I* Control | 138/125 | 81/32 |
| J | 416/454 | 213/189 |
| K | 325/469 | 145/123 |

*PEGMA only control

TABLE X(c)

HEAT AGED STRENGTH RETENTION (Tested at RT)

200° C., 3 weeks

| Compositions | Degreased Br./PR (in-lbs) | Oily Zn Phosphate Br./PR (in-lbs) |
|---|---|---|
| I* Control | 113/74 | 68/18 |
| J | 438/489 | 182/130 |
| K | 337/401 | 103/105 |

*PEGMA only control

TABLE X(d)

HEAT AGED STRENGTH RETENTION (Tested at RT)

200° C., 6 weeks

| Compositions | Hot strength Degreased Br./PR (in-lbs) | Oily Zn Phosphate Br./PR (in-lbs) |
|---|---|---|
| I* Control | 83/12 | 83/6 |
| J | 453/448 | 108/59 |
| K | 236/274 | 90/37 |

*PEGMA only control

As is evident from these data, cyanate ester containing compositions result in higher breakloose strength and prevail than those not containing cyanate esters on degreased steel after aging at 200° C.

Additionally, cyanate ester compositions perform better on degreased steel at up to six weeks of aging in comparison to the control.

Example 11

Cyanate Ester/Bismaleimide in (Meth)acrylate Based Anaerobic Adhesive

Formulations were prepared to study the effect of the bismaleimide resin in QMI 501 from Henkel Corporation in cyanate ester/PEGMA anaerobic adhesive formulations. QMI-501 contains the bismaleimide derivative of 10,11-dioctyl-1,20-eicosane. The components and amounts are indicated in Table XI.

For comparative purposes, Compositions J and K only contained a (meth)acrylate/cyanate esters composition as controls and Compositions L and M contained bismaleimide resin QMI 501 in the a (meth)acrylate/cyanate esters composition.

TABLE XI

EFFECT OF BISMALEIMIDE IN CYANATE ESTER/PEGMA FORMULATION

| Composition | QMI 501 | Cyanate Esters | (Meth)acrylate Anaerobic components |
|---|---|---|---|
| J* | 0 | 50% (B-30) | 50% |
| K* | 0 | 50% (L-10) | 50% |
| L | 20% | 40% (B-30) | 40% |
| M | 20% | 40% (L-10) | 40% |

*(meth)acrylate/cyanate esters controls

Example 12

Application and Ambient Cure of the Cyanate Ester Containing Compositions of Example 11

Compositions J, K, L and M were applied on degreased steel 110/111 nuts/bolts. The specimen were cured at room temperature for 72 hrs first, then heated to 150° C. for 1 hour, held at 150° C. for 1 hour, and then heated from 150° C. to 250° C. for 2 hours followed by a hold at 250° C. for 1 hour for post curing. The breakloose/prevail strength of the specimen are summarized in Table XII. These data indicate that all four formulations gave good cure strength at room temperature and very high strength after post heat curing on steel nuts/bolts.

TABLE XII

CURE STRENGTH AT ROOM TEMPERATURE AFTER 72 HOURS

| Composition | Br./PR. (in-lbs) RTC 72 hrs | Br./PR. (in-lbs) Post cured, test at RT |
|---|---|---|
| J* | 179/114 | 442/365 |
| K* | 119/52 | 422/337 |
| L | 198/121 | 216/382 |
| M | 146/49 | 320/290 |

Example 13

Application and Hot Strength of the Cyanate Ester with and without Bismaleimide Containing Compositions of Example 11

The steel fasteners assembled with Compositions J, K, L, and M were evaluated for their hot strength performance at 200° C. and 250° C. after curing at room temperature for 72 hours and post curing as described in Example 12. Tests for break strength and prevailing torque were performed. The results of these data are shown in Table XIII(a) and (b). All four formulations gave good hot strength at 200° C. The difference is that Compositions L and M with bismaleimide resin QMI 501 resulted in high hot strength at 250° C. while Compositions J and K without bismaleimide resin QMI 501 gave very low hot strength at 250° C. This result indicates that Compositions L and M with bismaleimide resin QMI 501 had a larger cross linking density than Compositions J and K without bismaleimide resin. Compositions L and M have better performance at 250° C. than Compositions J and K.

TABLE XIII(a)

| | HOT STRENGTH | |
|---|---|---|
| Composition | Br./PR. (in-lbs) Post cured, @ 200° C. | Br./PR. (in-lbs) Post cured, @ 250° C. |
| J* | 215/194 | 59/16 |
| K* | 211/178 | 69/23 |
| L | 285/183 | 257/120 |
| M | 210/200 | 209/107 |

TABLE XIII(b)

| | HOT STRENGTH | | |
|---|---|---|---|
| Composition | Aged @ 250° C. for 2 weeks Br./PR. (in-lbs) @ 250° C. | Aged @ 250° C. for 3 weeks Br./PR. (in-lbs) @ 250° C. | Aged @ 250° C. for 5 weeks Br./PR. (in-lbs) @ 250° C. |
| L | 257/120 | 198/104 | 175/77 |
| M | 209/107 | 246/201 | 195/172 |

Example 14

Application and Heat Aged Strength Retention of Cyanate Ester/Bismaleimide Containing Compositions of Example 11

Since Composition J and K—without bismaleimide resin—gave only 59 and 69 in-lb hot strength at 250° C., respectively, the heat aging test at 250° C. was discontinued. Steel fasteners were assembled with Compositions L and M with the bismaleimide resin used in QMI 501 and evaluated for their heat aged strength retention after curing and post heat curing as described in Example 12. Thereafter, they were subjected to elevated temperatures of 250° C. Tests for break strength and prevailing torque were performed. For each composition, the tests were taken at room temperature. The results of these data are shown in Table XIV.

TABLE XIV

| | HEAT AGED STRENGTH RETENTION (Tested at RT) | |
|---|---|---|
| Composition | Aged @ 250° C. for 2 weeks Br./PR. (in-lbs) @ RT | Aged @ 250° C. for 4 weeks Br./PR. (in-lbs) @ RT |
| L | 345/127 | 329/373 |
| M | 420/154 | 324/358 |

As is evident from these data, cyanate ester with bismaleimide resin QMI 501 compositions resulted in very high breakloose strength and prevail on degreased steel even after 5 weeks aging at 250° C.

Example 15

Formulations of Application of Cyanate Ester/Bismaleimide/Inorganic Filler in (Meth)acrylate Based Anaerobic Adhesive Another bismaleimide N,N'-phenylenedimaleimide (HVA-2), was mixed into PEGMA/L-10 cyanate ester formulation with filler aluminum silicate hydrate aiming to achieve temperature higher than 250° C. application. The components and amounts are indicated in Table XV. Composition N was applied to degreased steel nuts/bolts (⅜×16). The specimen were cured at room temperature for 72 hours first then heated to 150° C. in 1 hour, hold at 150° C. for 1 hour, then heated from 150° C. to 250° C. in 2 hours and hold at 250° C. for 2 hours for post curing.

TABLE XV

| CYANATE ESTER/BISMALEIMIDE HVA-2/PEGMA FORMULATION N | |
|---|---|
| Components | Formulation N (Wt %) |
| PEGMA | 29.6 |
| L-10 Cyanate Ester | 29.4 |
| HVA-2 | 13.7 |
| Saccharin | 2.0 |
| DEpT | 0.8 |
| NQ | 0.5 |
| EDTA | 1.2 |
| Aluminum silicate | 21.4 |
| CHP | 1.5 |

The specimen with Composition N was subjected to heat aging at gradually increasing temperature. The steel nuts/bolts gave 160 in-lb hot strength at 300° C., remained 148 in-lb strength at 350° C., then dropped to 57 in-lb at 450° C. as shown in Table XVI(a). However, the steel nuts/bolts had 232 in-lb room temperature break strength after heat aged 18 hours at 300° C. Then, heat aged strength dropped to 106 in-lb after heat aged 18 hours at 600° C. The break strength went up to 146 in-lb after heat aged at 600° C. for a week as shown in Table XVI(B). The inorganic filler played an important role in the formulation for temperatures above 350° C. applications.

TABLE XVI(a)

HOT STRENGTH OF COMPOSITION N

| Temperature | Curing/aging | Breakloose In-lb | Prevail In-lb |
|---|---|---|---|
| RT | RTC 72 hrs | 60 | 1 |
| 250° C. | 150-250° C. heat/post cured 5 hrs | 242 | 178 |
| 300° C. | Aged at 300° C. 18 hrs | 160 | 24 |
| 350° C. | Aged at 350° C. 5 hrs | 148 | 15 |
| 450° C. | Aged at 450° C. 2 hrs | 57 | 2 |

TABLE XVI(b)

HEAT AGED STRENGTH OF COMPOSITION N

| Temperature | Curing/aging | Breakloose In-lb | Prevail In-lb |
|---|---|---|---|
| RT | RTC 72 hrs | 60 | 1 |
| RT | Aged at 300° C. 18 hrs | 232 | 39 |
| RT | Aged at 600° C. 18 hrs | 106 | 3 |
| RT | Aged at 600° C. 4 days | 148 | 17 |
| RT | Aged at 600° C. 7 days | 146 | 40 |

It should be noted that desirable breakloose and prevail values depend on the particular application for which the composition of the invention is destined. Therefore, different breakloose strengths and prevailing torque values may be considered acceptable to accomplish the goal at hand. For many applications, break loose is an important parameter because once a fastener (e.g., a nut for a nut and bolt assembly) turns, the clamping force is effectively lost. The prevailing torque value, on the other hand, informs the user of when the fastener will come apart.

For certain applications, a high breakloose value is particularly desirable. Examples of those applications are ones where a maintenance-free or tamper-proof machine is the type of apparatus.

What is claimed is:

1. An anaerobically curable composition comprising:
   (a) a cyanate ester compound having the structure of formula I:

$$R^1\text{-}(O\text{-}C\equiv N)_m \qquad (I)$$

wherein m is from 2 to 5 and $R^1$ is an aromatic nucleus-containing residue;
   (b) a (meth)acrylate monomer; and
   (c) an anaerobic cure inducing composition comprising peroxide and saccharin, wherein said composition is free of added metallic catalyst.

2. The anaerobically curable composition of claim 1, wherein said cyanate ester compound is selected from the group consisting of 1,3-dicyanatobenzene; 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanato-biphenyl; bis(4-cyanatophenyl)methane; 3,3', 5,5'-tetramethyl, bis(4-cyanatophenyl)methane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)sulfide; 2,2-bis(4-cyanatophenyl)propane; tris(4-cyanatophenyl)-phosphite; tris(4-cyanatophenyl)phosphate; bis(3-chloro-4-cyanatophenyl)methane; cyanated novolac; 1,3-bis[4-cyanatophenyl-1-(methylethylidene)]benzene, cyanated, bisphenol-terminated polycarbonate,

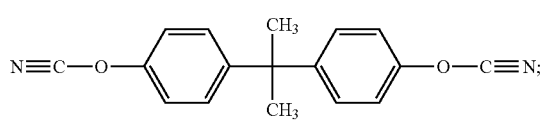

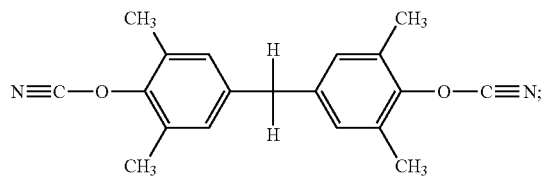

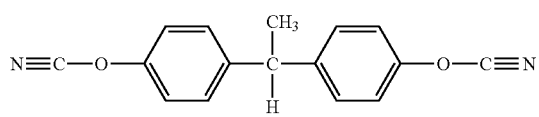

-continued

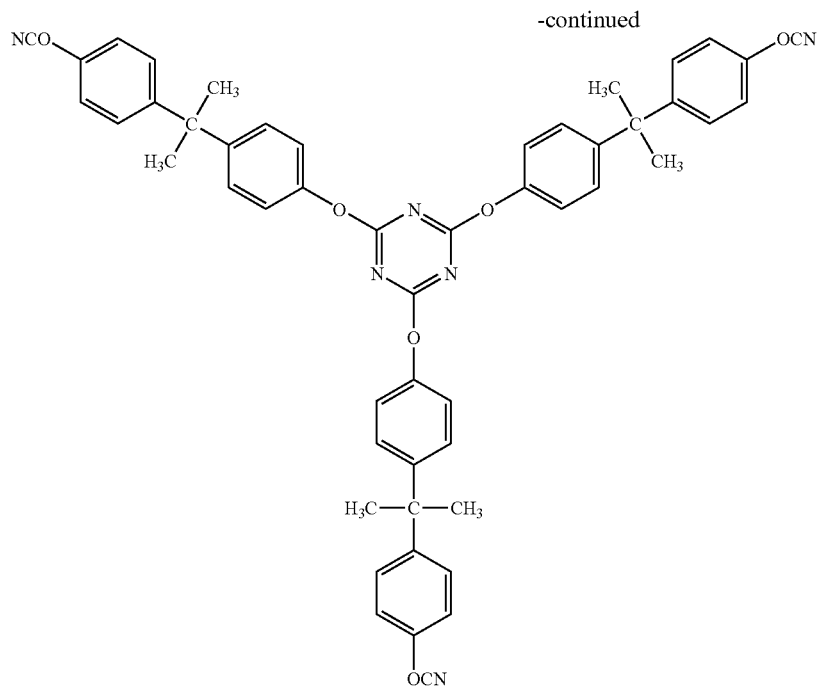

and combinations thereof.

3. The anaerobically curable composition of claim 1, wherein $R^1$ is derived from an aromatic hydrocarbon.

4. The anaerobically curable composition of claim 1, wherein $R^1$ is selected from the group consisting of benzene, biphenyl, naphthalene, anthracene and pyrene.

5. The anaerobically curable composition of claim 1, wherein $R^1$ is derived from a polynuclear aromatic hydrocarbon in which at least two aromatic rings are bonded to each other through a bridging member, wherein said bridging member has the formula:

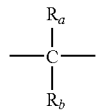

wherein $R_a$ and $R_b$ are the same or different and each represents a hydrogen atom or an alkyl group containing 1 to 4 carbon atoms.

6. The anaerobically curable composition of claim 1, wherein $R^1$ is derived from novolac-type phenolic resins.

7. The anaerobically curable composition of claim 1, wherein said (meth) acrylate monomer is selected from the group consisting of polyethylene glycol di(meth)acrylates, tetrahydrofuran (meth)acrylates, di(meth)acrylates, hydroxypropyl (meth)acrylate, hexanediol di(meth)acrylate, trimethylol propane tri(meth)acrylate, diethylene glycol di(meth)acrylate, triethylene glycol di(meth)acrylate, tetraethylene glycol di(meth)acrylate, dipropylene glycol di(meth)acrylate, di-(pentamethylene glycol) di(meth)acrylate, tetraethylene diglycol di(meth)acrylate, diglycerol tetra(meth)acrylate, tetramethylene di(meth)acrylate, ethylene dimethacrylate, neopentyl glycol diacrylate, trimethylol propane triacrylate, bisphenol-A di(meth)acrylates, ethoxylated bisphenol-A (meth)acrylate and combinations thereof.

8. The anaerobically curable composition of claim 1, wherein said (meth)acrylate monomer has the formula:

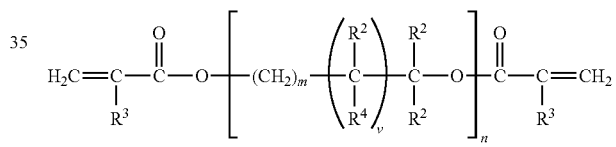

wherein $R^2$ may be selected from hydrogen, alkyl of 1 to about 4 carbon atoms, hydroxyalkyl of 1 to about 4 carbon atoms or

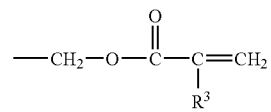

$R^3$ may be selected from hydrogen, halogen, and alkyl of 1 to about 4 carbon atoms;

$R^4$ may be selected from hydrogen, hydroxy and

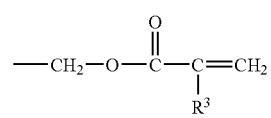

m is an integer equal to at least 1;

n is an integer equal to at least 1; and v is 0 or 1.

9. An anaerobically cured composition comprising the reaction product of (a) a cyanate ester compound having the formula:

 (I)

wherein m is from 2 to 5 and $R^1$ is an aromatic nucleus-containing residue;
(b) a (meth)acrylate monomer;
(c) an anaerobic cure inducing composition comprising peroxide and saccharin; and
(d) an active metallic surface, wherein said composition was free of added metallic catalyst.

10. A method for bonding metallic surfaces comprising:
(a) providing activated metallic mating surfaces;
(b) applying to at least one of said mating surfaces an anaerobically curable composition comprising a cyanate ester compound having the formula:

 (I)

wherein m is from 2 to 5 and $R^1$ is an aromatic nucleus-containing residue and an anaerobic cure inducing composition comprising peroxide and saccharin, wherein said composition is free of added metallic catalyst; and
(c) mating said surfaces and allowing said anaerobically curable composition to cure therebetween.

11. An article of manufacture comprising:
substrates, at least one of which having active metallic surfaces and an anaerobically curable composition therebetween to adhesively join the substrates to one and the other, wherein the anaerobically curable composition comprises a cyanate ester compound and an anaerobic cure inducing composition comprising peroxide and saccharin, and said composition is free of added metallic catalyst.

12. The article of manufacture according to claim 11, wherein said article is a threaded fastener.

13. The article of manufacture according to claim 11, wherein said article comprises a nut and a bolt.

14. A cured composition formed by the process of:
(a) providing a substrate having an active metallic surface;
(b) applying an anaerobically curable composition thereto wherein the anaerobically curable composition comprises a cyanate ester compound and an anaerobic cure inducing composition comprising peroxide and saccharin, wherein said composition is free of added metallic catalyst; and
(c) subjecting said composition to anaerobic conditions suitable to effectuate cure.

15. A method for producing threadlocking matable parts said method comprising the steps of:
(a) applying an anaerobically composition comprising a cyanate ester compound and an anaerobic cure inducing composition comprising peroxide and saccharin, free of added metallic catalyst to at least a portion of an engagement surface of a matable part which is matably engageable with a complimentary engagement structure;
(b) mating said complimentary engagement structures; and
(c) subjecting said composition to anaerobic conditions suitable to effectuate cure at room temperature, thereby forming threadlocked matable parts.

* * * * *